No. 662,828. Patented Nov. 27, 1900.
W. SHUEY.
PIPE JOINT.
(Application filed Feb. 3, 1900.)
(No Model.)
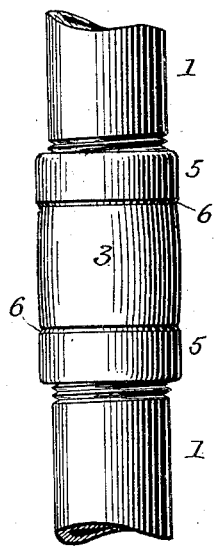
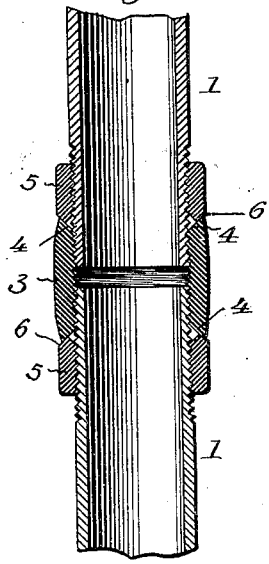
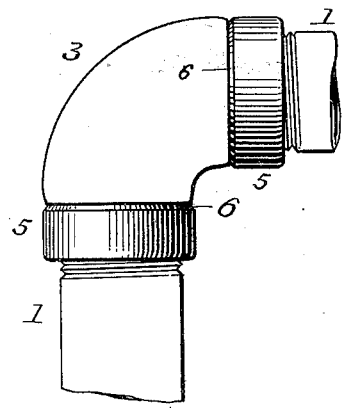
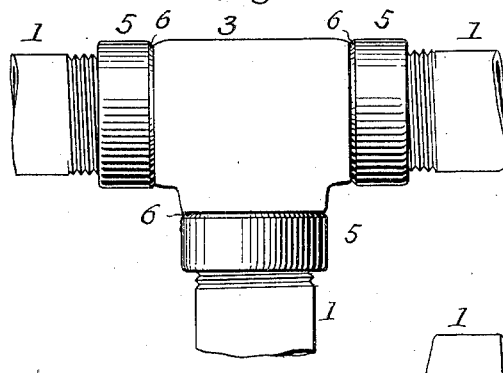
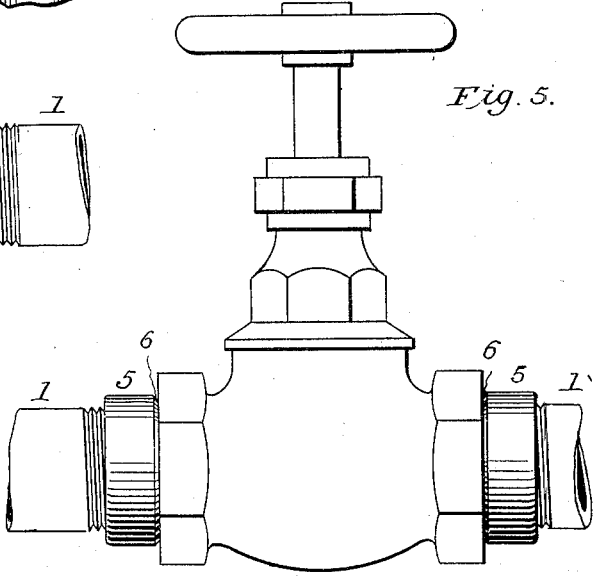
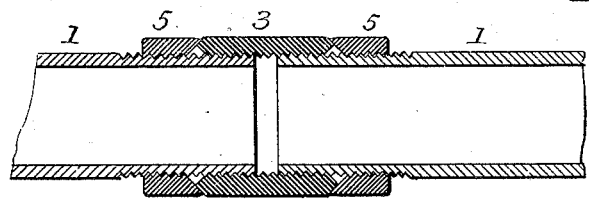
Witnesses
Katharine O'Rear
C. B. Bull
Inventor
William Shuey
by G. H. W. T. Hames
Attorneys

UNITED STATES PATENT OFFICE.

WILLIAM SHUEY, OF WELLSBURG, WEST VIRGINIA.

PIPE-JOINT.

SPECIFICATION forming part of Letters Patent No. 662,828, dated November 27, 1900.

Application filed February 3, 1900. Serial No. 3,844. (No model.)

*To all whom it may concern:*

Be it known that I, WILLIAM SHUEY, a citizen of the United States, residing at Wellsburg, in the county of Brooke and State of West Virginia, have invented a new and useful Improvement in Pipe-Joints, of which the following is a specification, reference being had to the accompanying drawings and to the numerals of reference marked thereon.

My invention relates to a pipe-joint for gas, air, steam, and other liquids, as also fluids; and its object is to produce a tight joint in a straight pipe, or with an elbow, T, or other connection, or between a pipe and a valve, or in other mechanical relations.

In the accompanying drawings, Figure 1 is an exterior view of my invention as applied to a straight pipe-joint. Fig. 2 is a longitudinal section of the same. Fig. 3 shows the connection with an elbow. Fig. 4 illustrates a similar connection with a T. Fig. 5 shows the invention applied to a valve. Fig. 6 is a longitudinal section showing a modification.

Similar numerals of reference indicate similar parts in the respective figures.

1 1 are two sections of a pipe connected by means of a collar 3, interiorly threaded to receive the exterior thread of each pipe-section. The tight connection between the two sections of pipe and the collar may be aided in the ordinary manner by the use of red lead or other substance. Each end of the collar 3, as shown in Figs. 1 and 2, is interiorly beveled, as at 4. On each section of the pipe is a ring 5, interiorly threaded so as to fit and move upon the thread of the section of pipe upon which it is placed. The inner edge of each ring 5 is exteriorly beveled, as at 6, to fit the internally-beveled inner edge of the collar, as will be readily understood. As shown in Figs. 1 and 2, the pipe connection is completed, the sections 1 and 2 of the pipe being screwed into the collar 3 and the rings 5 being screwed home, so that their beveled ends fit within the beveled portions of the collar. It will be observed that a slight space is left between each end of the collar 3 and the inner edge of the adjacent ring 5, which space may be filled with any substance, such as putty, rubber, asbestos, clay, cement, plaster-of-paris, or other suitable filling. This space is formed, as seen in Fig. 2, by reversely beveling the inner ends of the rings 5, and in Fig. 6 by underbeveling the ends of the collar 3. In each case a space triangular in cross-section is formed, and the packing substance placed therein is in the tightening up of the several parts of the connection squeezed or pressed, as by a wedge formation, tightly into whatever crevice may exist between the ring and collar.

In Fig. 6 each ring is provided with an internal and each end of the collar with an external bevel, the condition, therefore, being the reverse of that shown in the other figures.

It is obvious that this invention is applicable to other forms of pipe connections, as with elbows, Fig. 3, T's, Fig. 4, valves, Fig. 5, and the like. The advantages of my invention are that a tight-fitting overlapping joint can be produced with a straight pipe, valve, elbow, T, or other equivalent device in a simple and cheap manner and that a right or left hand thread may be used. It is also apparent that the same results are produced whether the internal bevel is upon the collar or the ring and that the collar and ring may be made of any desired length.

It has been found in practice that this invention furnishes a perfectly tight joint for fluids and liquids, particularly such fluids as from their volatility have heretofore been difficult to deal with. While two sections of pipe are here shown, it is obvious that in using this invention with an elbow, valve, or device of similar character but one section of pipe would be needed, and I therefore do not confine myself to the use of the invention with two sections of pipe, and in employing the word "collar" I wish it to include an elbow, T, valve, or similar device used with such a pipe connection as that described.

I claim—

In a pipe connection, an exteriorly-threaded pipe, an interiorly-threaded collar, and an interiorly-threaded ring adapted to move upon the threaded end of the pipe, said collar and ring having coacting beveled and overlapping edges arranged to form both a joint and a packing-space, the latter by the reverse bevel of a member of the connection, as described, all combined substantially as set forth.

In testimony whereof I hereunto set my hand and seal.

WILLIAM SHUEY. [L. S.]

Witnesses:
HARRY A. DODD,
GEO. E. SCHMITT.